US012528012B2

(12) United States Patent
Goglin

(10) Patent No.: US 12,528,012 B2
(45) Date of Patent: Jan. 20, 2026

(54) LEVEL CHANGING IN A GAME STREAMING SYSTEM

(71) Applicant: GOOGLE LLC, Mountain View, CA (US)

(72) Inventor: Stephen D. Goglin, Portland, OR (US)

(73) Assignee: GOOGLE LLC, Mountain View, CA (US)

( * ) Notice: Subject to any disclaimer, the term of this patent is extended or adjusted under 35 U.S.C. 154(b) by 269 days.

(21) Appl. No.: 17/924,403

(22) PCT Filed: May 13, 2020

(86) PCT No.: PCT/US2020/032665
§ 371 (c)(1),
(2) Date: Nov. 10, 2022

(87) PCT Pub. No.: WO2021/230862
PCT Pub. Date: Nov. 18, 2021

(65) Prior Publication Data
US 2023/0173382 A1 Jun. 8, 2023

(51) Int. Cl.
*A63F 13/355* (2014.01)
*A63F 13/49* (2014.01)
*A63F 13/52* (2014.01)

(52) U.S. Cl.
CPC ............ *A63F 13/355* (2014.09); *A63F 13/49* (2014.09); *A63F 13/52* (2014.09); *A63F 2300/5533* (2013.01); *A63F 2300/554* (2013.01)

(58) Field of Classification Search
CPC ......... A63F 13/355; A63F 13/49; A63F 13/52
See application file for complete search history.

(56) References Cited

U.S. PATENT DOCUMENTS 10,576,380 B1 3/2020 Beltran et al.
2014/0024457 A1* 1/2014 Justice ................. A63F 13/355 463/43

(Continued)

FOREIGN PATENT DOCUMENTS

WO 2014078452 A1 5/2014
WO 2017116874 A1 7/2017

(Continued)

OTHER PUBLICATIONS

Translation of Korean Notice of Office Action mailed Aug. 9, 2024 for KR Application No. 10-2022-7042615, 18 pages.

(Continued)

*Primary Examiner* — Yingchuan Zhang

(57) ABSTRACT

A game streaming system concurrently executes different instances of a game program, each instance employing a different set of hardware resources, including different local memory, such as the hardware resources of different servers or different GPUs. Based on a game state, the game streaming system streams rendered frames from a first set of hardware resources associated with the game level to a client device wherein the rendered frames, depicting a portion of a virtual environment. In response to an indication from the game program of a game level change to a new game level, the game streaming system transfers a player state to another set of hardware resources, and begins streaming rendered frames to the client device from the other of hardware resources.

18 Claims, 4 Drawing Sheets

(56) References Cited

U.S. PATENT DOCUMENTS

| | | | | |
|---|---|---|---|---|
| 2014/0057722 | A1 | 2/2014 | Justice et al. | |
| 2015/0141152 | A1 | 5/2015 | Justice et al. | |
| 2016/0080442 | A1* | 3/2016 | Justice | A63F 13/77 709/219 |
| 2016/0256784 | A1 | 9/2016 | Schultz et al. | |
| 2017/0087464 | A1 | 3/2017 | Perry et al. | |
| 2018/0021684 | A1 | 1/2018 | Benedetto | |
| 2020/0206628 | A1 | 7/2020 | Benedetto et al. | |
| 2020/0238181 | A1 | 7/2020 | Fang et al. | |
| 2021/0093952 | A1* | 4/2021 | Ronsse | G06F 13/38 |

FOREIGN PATENT DOCUMENTS

| | | | |
|---|---|---|---|
| WO | 2019074952 | A2 | 4/2019 |
| WO | 2019097837 | A1 | 5/2019 |

OTHER PUBLICATIONS

International Search Report and Written Opinion mailed Feb. 8, 2021 for corresponding International Application No. PCT/US2020/032665, 14 pages.
International Preliminary Report on Patentability mailed Nov. 24, 2022 for PCT Application No. PCT/US2020/032665, 9 pages.
Translation of Notice of Grounds of Rejection mailed Dec. 12, 2023 for JP Application No. 2022-568938, 9 pages.
Translation of Notification of First Office Action mailed Nov. 18, 2024 for CN Application No. 202080100865.9, 20 pages.
Communication Pursuant to Article 94(3) EPC mailed Dec. 5, 2024 for EP Application No. 20729534.6, 10 pages.
Translation of Korean Notice of Allowance mailed Mar. 19, 2025 for KR Application No. 10-2022-7042615, 3 pages.
Translation of Notification for Patent Registration Formalities mailed Oct. 10, 2025 for CN Application No. 202080100865.9, 4 pages.

* cited by examiner

LEVEL CHANGING IN A GAME STREAMING SYSTEM

CROSS-REFERENCE TO RELATED APPLICATIONS

The present application is a U.S. National Stage under 35 U.S.C. § 371 of International Patent Application Serial No. PCT/US2020/032665, entitled "LEVEL CHANGING IN A GAME STREAMING SYSTEM" and filed on May 12, 2020, the entirety of which is incorporated by reference herein.

BACKGROUND

Video game systems, such as game consoles or personal computers, allow a user to interact with a virtual environment generated by a game program. The user interacts with the game program via a game controller or other input device and, in response to the user inputs, the game program modifies a game state associated with the game. Based on the game content, the game program changes the aspects of the virtual environment displayed for the user. Thus, through a series of inputs that alter the game state, the user plays the game associated with the game program.

To generate and display the virtual environment for the user, the game program employs game assets, such as stored graphical objects, textures, sound files, and the like. To access game assets quickly and thereby provide a satisfying user experience, the game program typically stores necessary assets in relatively fast memory, such as dynamic random-access memory (DRAM). However, many game programs implement large virtual environments, wherein all of the game assets associated with the entire virtual environment cannot be stored in the relatively fast memory. Such game programs typically employ a "leveling" approach, wherein the virtual environment is separated into relatively discrete levels or worlds. The game program stores the entire set of assets associated with the virtual environment at a relatively slow memory, such as one or more disk drives, and loads to the faster memory only those assets associated with a level that the user is currently interacting with.

In response to the user changing levels (that is, the user providing game inputs indicating that the game level is to be switched), the game program transfers the game assets associated with the new level (the level being switched to) from the slower memory to the faster memory. However, this transfer process can require a relatively large amount of time, requiring the game program to suspend the flow of the game such as by, for example, displaying a "loading screen" to the user while the transfer takes place. Such interruptions in the game flow can negatively impact the user experience with the game.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
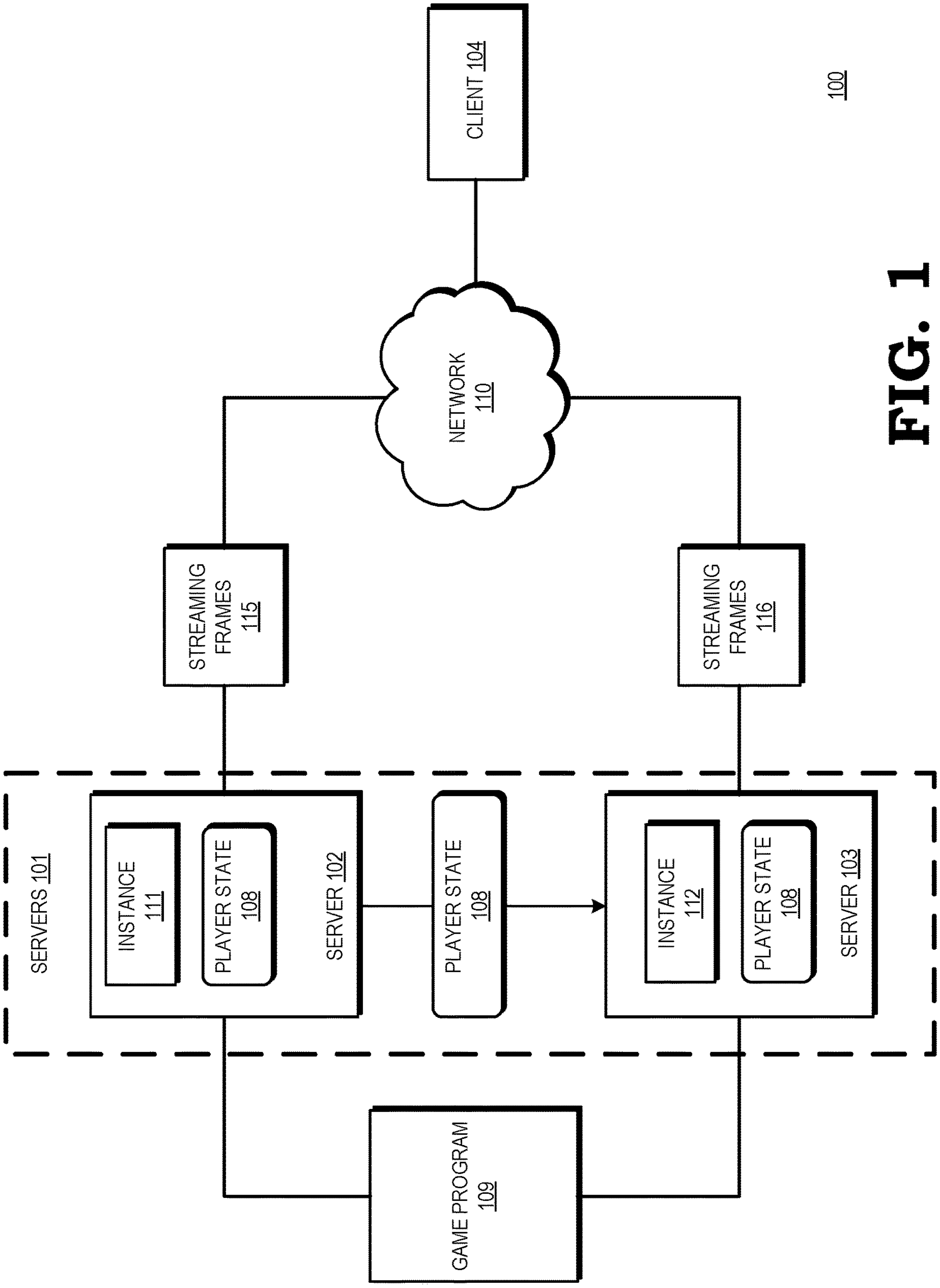
FIG. 1 is a block diagram of a game streaming system that transfers player state information between concurrently executing game instances in response to a game level change in accordance with some embodiments.

FIGS. 1-5 illustrate techniques for improving the user experience during level switches in a game streaming system in accordance with some embodiments. The game streaming system concurrently executes different instances of a game program, each instance employing a different set of hardware resources, including different local memory, such as the hardware resources of different servers or different GPUs. Each game instance loads assets of a different game level to the corresponding local memory. Based on a game state indicating a given game level, the game streaming system streams rendered frames from a first set of hardware resources associated with the game level to a client device wherein the rendered frames, depicting a portion of a virtual environment. In response to an indication from the game program of a game level change to a new game level, the game streaming system transfers a player state to a second set of hardware resources associated with the new game level, and begins streaming rendered frames to the client device from the second set of hardware resources. The game streaming system thereby reduces or eliminates the amount of time that a game flow is interrupted, thereby improving the user experience.

To illustrate further via an example, in some embodiments the game streaming system includes two servers, designated for purposes of the example as Server A and Server B, and concurrently executes instances of a game program at each of Server A and Server B. Each of the servers A and B loads assets of a different game level, designated Level A and Level B, respectively, to local DRAM memory so that the assets can be quickly accessed to render frames for streaming. The user of a client device (e.g., a computer or video streaming device) initiates the game, and initially accesses Level A. Accordingly, the game streaming system employs the game instance executing at Server A to generate rendered frames, representing the virtual environment associated with Level A, based on the assets stored at the local memory for Server A, and streams the rendered frames from Server A to the client device. In addition, Server A maintains player state information, representing information about the user's interactions with the game during the current game session.

In response to the user's interactions requiring the game program to initiate a level change to Level B, the game streaming system transfers the player state to Server B. The game instance at Server B begins generating rendered frames representing the virtual environment associated with Level B, based on the assets stored at the local memory for Server B, and streams the rendered frames from Server B to the client device. The game streaming system synchronizes the change in the source of rendered frames from Server A to Server B so that the change in servers is transparent to the user of the client device. Further, because Server B has pre-loaded the assets associated with Level B to the corresponding local memory, Server B can begin generating the rendered frames associated with Level B relatively quickly. In contrast, a conventional system must load assets of each new level from a relatively slow data store (e.g., a hard drive), requiring the user to pause interactions with the game while the assets are loaded from the data store. Accordingly, by transferring player state to a different game instance with pre-loaded level assets, the game streaming system reduces the time associated with changing game levels, thereby improving the user experience.

FIG. 1 illustrates a game streaming system 100 that is generally configured to stream rendered game content from a set 101 of servers to a client device 104, and to transfers player state information between concurrently executing game instances in response to a game level change in accordance with some embodiments.

In the depicted example, the set 101 of servers and the client device 104 communicate via a network 110, wherein the network 110 is a packet-switched or other network that is generally configured to transfer data, including video data, via one or more routers, servers, communication towers (e.g. cellular communication towers), and the like, or any combination thereof. Accordingly, in various embodiments, the network 110 is a wide-area network (e.g., the Internet), a local-area network, and the like, or any combination thereof.

The set 101 of servers and the client device 104 are generally configured to collectively implement a streamed game session wherein interactive game content is streamed from the set 101 of servers to the client device 104. The set 101 of servers includes a plurality of servers, such as the illustrated servers 102 and 103. Each of the servers 102, 103 can be any type of computer device that implements the functionality described further herein, such as a rack-mounted server, a cluster server (i.e. a server device implemented in a cluster of server devices), a mobile server device, and the like, or a combination thereof. The client device 104 can be any computer device that can display video frames to a user and can receive user input, and therefore can be a desktop or laptop computer, a digital media player (e.g., a streaming media player), a game console, a smartphone, a tablet, and the like.

To support streaming of game content to the client device 104 during a streamed game session, each of the servers 102, 103 includes a plurality of processing units, such as a central processing unit (CPU) and a graphics processing unit (GPU). The CPU is a processing unit generally configured to execute general purpose sets of instructions, organized in the form of computer programs, to carry out tasks on behalf of the server. Examples of such computer programs include operating systems, virtual machines, data security programs (e.g. data encryption/decryption programs), web pages, database programs, and the like.

The GPU is a processing unit generally configured to execute operations associated with graphics and vector processing based on commands received from the CPU. For example, in the course of executing one or more general purpose programs, the CPU generates commands to generate and manipulate graphical models for display and provides the commands to the GPU. In response, the GPU executes the commands by executing one or more corresponding graphical operations, thereby manipulating the graphical models to generate one or more frames for display. In some embodiments, the frames generated by the GPU are rendered frames ready for display at a display device.

To support reception and display of streamed game content, the client device 104 includes a CPU and a GPU (not illustrated). Each of these modules is analogous to the corresponding module of the servers 102, 103. Thus, for example, the CPU of the client device 104 is generally configured to execute general-purpose instructions on behalf of the client device 104, such as executing one or more of an operating system, a web browser, and the like. It will be appreciated that, in some embodiments, the client device 104 generally has relatively small compute power relative to the servers 102, 103. The game streaming system 100 thus leverages the computing power of the server 102, 103 to stream game content to the client device 104 that is of higher quality than can be generated by the client device 104 alone.

In operation, the client device 104 initiates a game streaming session in response to a user requesting the game session via a computer program (not shown) executed at the client device 104, such as via a web browser, a dedicated game streaming program, a video streaming service program, and the like. In response to the user request, the client device sends a game session request via the network 110 to the server 102. In response, the server 102 initiates execution of a game program 109. In some embodiments, the server 102 is configured to execute any one of a library of game programs, and the request provided by the client device 104 indicates the particular one of the game programs to be executed.

To support reduced interruptions in a game flow, in response to the game session request, each of the servers 102, 103 initiate execution of a separate instance of the game program 109, designated instances 111 and 112 respectively. In some embodiments, each of the instances 111 and 112 include the same instructions of the game program 109 to be executed but employ different game assets to implement different game levels, as described further herein. In particular, in the illustrated example it is assumed that each of the servers 102, 103 is designated to implement a different game level, employing different game assets, such as different graphical objects, textures, audio files, and the like.

In response to the user initiating the game program 109, each of the servers 102, 103 initiates instance 111 and 112, respectively, and loads the assets of the corresponding game level from a data store to a local memory (not shown at FIG. 1) where the assets can be accessed relatively quickly. Each of the instances 111 and 112 determines an initial game level associated with the game program for the current game session. In some embodiments, the initial game level may be a fixed game level. In other embodiments, the initial game level may be indicated by the user, or indicated by stored game state information, such as a save file. The server associated with the initial game level executes the corresponding game instance to generate a set of frames for streaming to the client device 104. The other server can enter a suspended state to await transfer of player state information, as described further below. For purposes of example, it is assumed that server 102 is associated with the initial game level.

During execution, the instance 111 maintains a collection of data, referred to as a game state, that represents the condition, or state, of the game. A user of the client device 104 employs an input device to provide input data. The input device can be a keyboard, game controller, microphone, or other input device, or any combination thereof. The client device 104 communicates the input data to the instance 111 via the network 110. In response to the input data, the instance 111 modifies the game state according to the rules of the particular game implemented by the game program 109.

Based on the game state, and according to the rules of the implemented game, the instance 111 employs the CPU and the GPU of the server 102 to generate rendered frames, representing visual game information such as a virtual environment, a game board, a selection screen, a heads-up display (HUD) and the like, or any combination thereof. The server 102 provides these rendered frames, designated streamed frames 115, to the network 110 for communication to the client device 104. The client device 104 receives at least a subset of the streamed frames 115 and employs a GPU to display the received frames at a display (not shown). The client device 104 thus displays the visual game information to the user who, in response, uses the game controller or other input device to provide further input data, resulting in further changes to the game state maintained by the game program 109 and corresponding changes to frames of the frame stream 115. In this way, the user of the client device 104 interacts with the game program 109 to play the game executed at the server 102.

As the user plays the game, the instance 111 maintains a data structure (e.g., a data file), designated player state 108, that represents one aspect of the game state that is uniquely associated with the current game session, with the user of the client device 104, or any combination thereof. The player state 108 can therefore represent a player score, the progression or state of a game character, game items collected or modified by the user, the state of non-player characters associated with the game, and the like, or any combination thereof.

While playing the game, the user of the client device can interact with the game instance 111 in one or more specified ways that indicate a change in the game level associated with the game program 109. In some embodiments, the different levels are determined by the designer or programmer of the game program 109 and are therefore identified by the program itself in response to a game level change indication. Examples of game level change indications include the user selecting a particular game level via an input device, a progress of a game character indicating a specified progress (e.g., the game character moving to a new or different section of a virtual environment), and the like.

In some embodiments, a game level change is indicated when the instance 111 determines that new or different game assets are to be loaded into a local memory. For example, the instance 111 can keep a manifest of game assets required to generate the streamed frames 115 and can update the manifest based on the game state. In response to determining that a game asset listed in the manifest is not stored at the local memory, the instance 111 can identify a level change.

It is assumed for purposes of the example of FIG. 1 that the game level change indicates a change to the level associated with the server 103. Accordingly, in response to identifying the level change, the game instance 111 transfers the player state 108 to the server 103. In some embodiments, the game instance 111 transfers the player state 108 by communicating the player state 108 to the server 103 via a network, such as the network 110 or a local area network connecting the set 101 of servers. In some embodiments, the game instance 111 provides an indication of the level change with the player state 108. In addition, the game instance 111 can provide a command or other indication to the client device 104 that user inputs associated with the game program 109 are to be directed to the server 103, and that the client device 104 is to receive streamed frames associated with the game program 109 from the server 103.

In response to receiving the player state 108, the instance 112 initiates execution of the game. In particular, in similar fashion to that described above with respect to the server 102, the instance 112 maintains a game state for the game, and modifies the game state based on the input data provided by the client device 104, wherein the input data is based on the user's interaction with the input device. Based on the game state, and according to the rules of the implemented game, the instance 112 employs the CPU and the GPU of the server 103, using game assets stored at the corresponding local memory, to generate rendered frames and provides these rendered frames, designated streamed frames 116, to the network 110 for communication to the client device 104. The client device 104 receives at least a subset of the streamed frames 116 and employs the GPU to display the received frames at the display. The game instance 112 at the server 103 thus continues the game session previously conducted by the game instance 111 at the server 102.

The game instance 112 employs the transferred player state 108 to continue the game session, and in particular uses the transferred player state to maintain the overall game state and to generate the streamed frames 116. This ensures that the change in servers executing the game program 109 is not visible to the user of the client device 104. That is, transferring of the player state 108 allows the instances 111 and 112 to collectively execute the game program 109 as if the game program 109 were executing on a single server or other set of hardware resources. Each of the instances 111 and 112 employs the hardware resources of the corresponding server (server 102 and 103, respectively) to implement the corresponding game level, but the change in the particular hardware resources executing the game program 109 is not visible to the user of the client device 104.

It will be appreciated that the game streaming system 100 of FIG. 1 is an example, and in other embodiments the system 100 can include additional servers in the server set 101. For example, in some embodiments the game program 109 can implement N different game levels, and the set 101 of servers includes N different servers, with each server assigned to implement a different one of the N game levels. In response to identifying a change in a game level from a first level to a second level, a server implementing the first level can identify and select the server associated with the second level, and transfer the player state 108 to the second server. The second server executes an instance of the game program 109 to implement the second level based on the transferred player state. In response to identifying a change in the game level from the second level to a third level, the second server transfers the player state to the server associated with third level. In this way, the game streaming system 100 can transfer the player state 108 between the servers of the set 101 to implement different game levels, reducing level loading times and improving the user experience with the game.

In other embodiments, a single server can implement more than one game level, but includes multiple sets of hardware resources, with each set of hardware resources assigned to implement a different game level. For example, in some embodiments a single server includes N GPUs, with each GPU assigned to generate the frames associated with a different one of the N levels associated with the game program. In response to the game program 109 indicating a level change, the server changes the GPU generating frames to the GPU assigned to the new level.

In some embodiments, the server 103 pre-loads assets for the corresponding game level prior to a local memory prior to receiving the player state 108, thereby supporting faster rendering of the streaming frames 116. To illustrate, to generate the streaming frames 116 for a given game level, the server 103 employs game assets, such as data structures representing game objects, textures, and the like. The particular assets required for rendering one or more of the streaming frames 116 can vary based on the player state 108. By pre-loading the assets for a level to a local memory prior to receiving the player state 108, the server 103 reduces loading times for those assets, and can quickly initiate rendering, using the pre-loaded assets, in response to receiving the player state 108 from the server 102, thereby improving the user experience.

Figure 2:
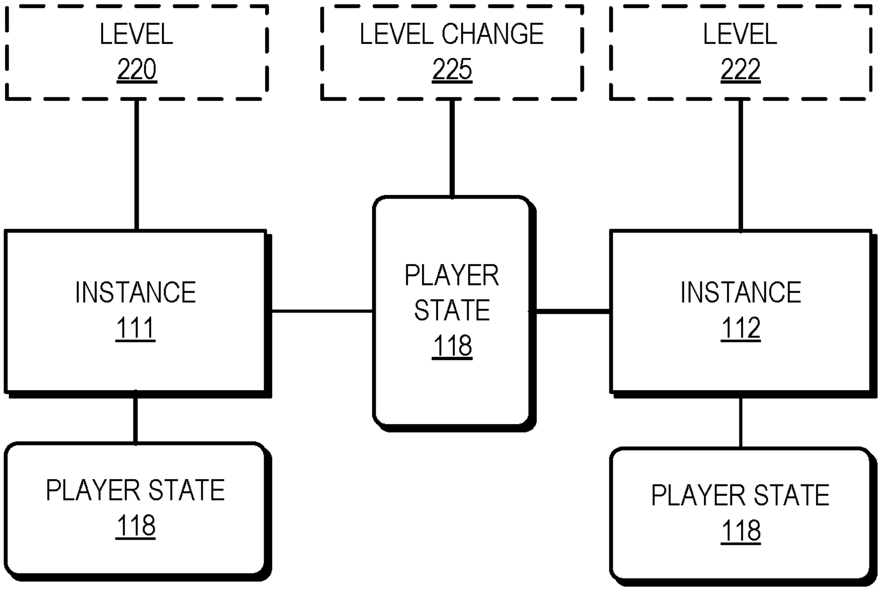
FIG. 2 is a block diagram illustrating an example of the game streaming system of FIG. 1 transferring player state information in response to a game level change in accordance with some embodiments.

FIG. 2 illustrates an example of the game streaming system 100 of FIG. 1 transferring the player state 108 in accordance with some embodiments. In the depicted example, the server 102 executes the instance 111 of the game program 109 to implement a game level 220. In particular, the instance 111 implements the game level 220 by generating the streaming frames 115, based on the game state, as modified by user inputs received from the client device 104, and based on the game assets associated with the game level 220. For example, in some embodiments the game state indicates the particular assets required to generate a frame for streaming, such as the assets representing the portion of a virtual environment visible or otherwise perceivable to a game character (e.g., graphical objects and textures visible to the game character). The instance 111 generates the frame using the assets to visually represent the portion of the virtual world and provides the frame to the client device 104 via the streaming frames 115.

In response to a specified user interaction with the game, the instance 111 determines a level change indication 225. In some embodiments, the level change indication 225 is any user input, or series of user inputs, that indicate the game program 109 is to change game levels. For example, in some embodiments the level change indication 225 is a user input, or series of user inputs, indicating a user selection from a list of game levels presented to the user by the instance 111. In other embodiments, the level change indication is a user input, or series of user inputs, indicating that a game character has exited a portion of the virtual environment associated with the game level 220 and has entered a different portion of the virtual environment associated with a different game level, designated game level 222.

In response to the level change indication 225, the instance 111 initiates a level change by transferring the player state 118 to the instance 112 executing at the server 103. In addition, the instance 111 provides an indication to the client device 104 that subsequent user inputs are to be directed to the server 103, and an indication that subsequent streamed frames associated with the game 109 are to be received from the server 103. For example, in some cases a client program (not shown) executing at the client device 104 provides an interface to the game program 109, including storing a network address of the server (referred to as the "target server address") that is executing the instance of the game program 109 for the current game level. The client program uses the network address to direct user inputs received at the client device 104, and to received streamed frames for display. In response to the level change indication 225, the instance 111 provides the network address of the server 103 to the client program, which stores the received address as the target server address.

The instance 112 receives the player state 118 from the server 102 and in response begins implementing the game level 222 using the received player state 118. In some embodiments, the instance 112 employs a patching technique to incorporate the received player state 118. For example, in some embodiments the instance 111 provides the player state 118 as a binary code file, and the instance 112 inserts the binary code of the player state 118 at a designated location of the instance 112, thereby allowing the player state 118 to be used to generate streamed frames according to the rules implemented by the game program 109. In other embodiments, the instance 112 includes a pointer to a memory location that is expected to store the player state 118, and the instance 112 incorporates the player state 108 by storing the received player state 108 at the specified memory location.

Figure 3:
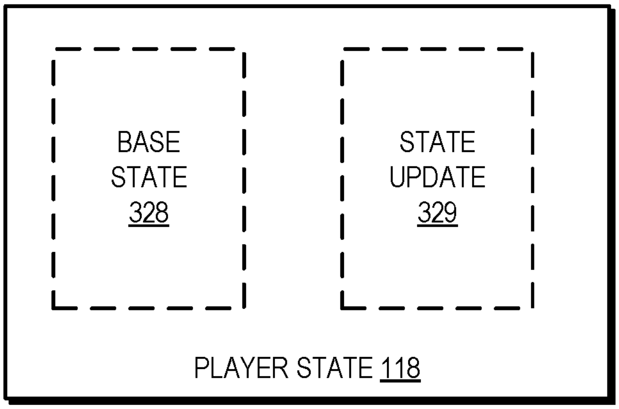
FIG. 3 is a block diagram of player state information associated with a game program of the game streaming system of FIG. 1 in accordance with some embodiments.

In some embodiments, the game streaming system 100 reduces the amount of player state information being transferred between servers or other hardware resources by transferring only changes to the player state relative to a stored base state. An example is illustrated at FIG. 3 in accordance with some embodiments. In the depicted example, the player state 108 includes a base state 328 and state update information 329. The base state 328 includes player state information representing a base state of the player, without modification by a particular instance of the game program 109. For example, in some embodiments, when the user terminates a game session of the game program 109, the currently executing instance of the game program 109 (e.g., instance 111) stores the current player state as the base state 328.

In response to the user subsequently initiating another game session at the client device 104, each server of the set 101 pre-loads a corresponding game instance and also pre-loads assets, for the game level to be implemented at the server, to a local memory. In addition, each server of the set 101 pre-loads the base state 328 to the local memory.

While an instance of the game program 109 is executing, including generating rendered frames for streaming, the instance identifies changes to the player state 108, and stores information indicative these changes as the state update information 329. Examples of such changes include changes to a player score, to aspects of a player character associated with the user (e.g., changes to player character's equipment, player character attributes and characteristics, cosmetic changes to the player character's appearance), and the like.

In response to identifying a level change, the executing instance transfers only the state update information 329, rather than the entire player state 108. For example, referring again to FIG. 2, in response to the level change indication 225, the instance 111 transfers the state update information 329 to the instance 112, and omits the base state 328, as that base state information has been pre-loaded to a local memory of the server 103. By transferring only the state update information 329, rather than the entire player state 108 with the base state 328, the game streaming system 100 reduces communication overhead between the servers of the set 101 and can further reduce level loading times.

In response to receiving the state update information 328, the instance 112 accesses the base state information 328 at the local memory and modifies the base state information 328 to reflect the changes indicated by the state update information. The player state information 108 at the server 103 is thereby updated to reflect the changes in the player state that occurred while the instance 111 was implementing the game level 220.

Figure 4:
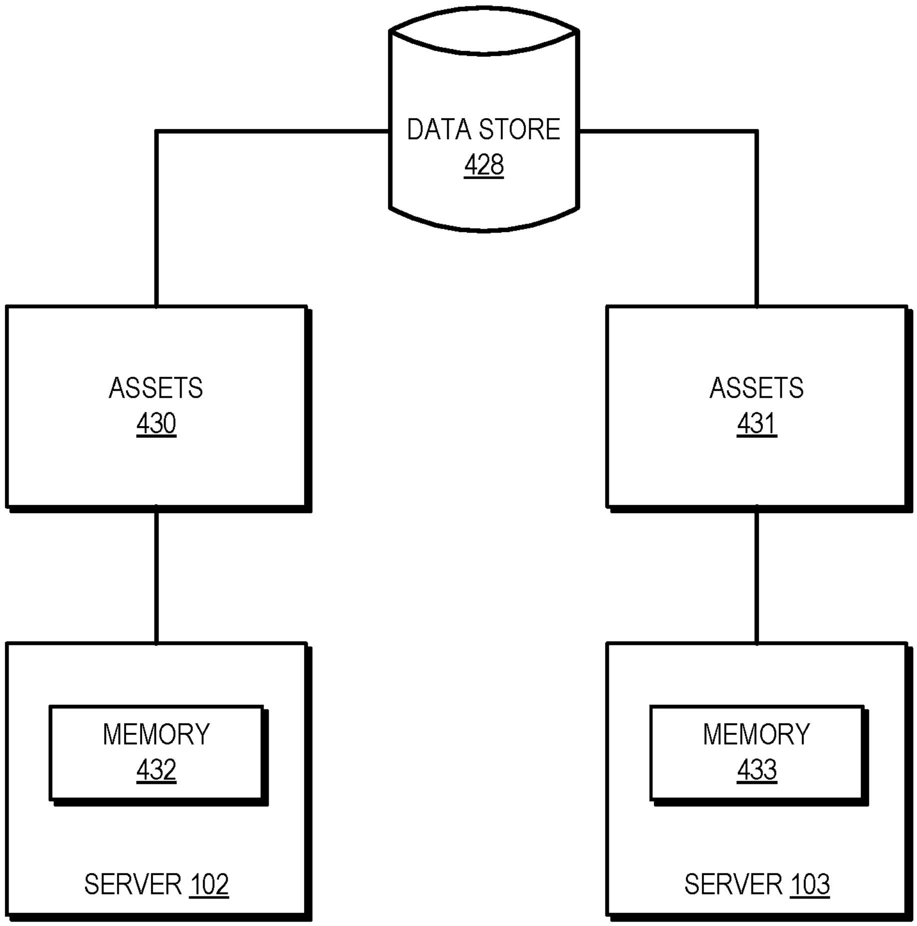
FIG. 4 is a block diagram illustrating an example of the game streaming system of FIG. 1 pre-loading assets associated with different game levels to different servers in accordance with some embodiments.

FIG. 4 is a block diagram illustrating the servers 102 and 103 pre-loading assets for corresponding game levels in accordance with some embodiments. In the depicted embodiment, each of the servers 102 and 103 can access a data store 428 that stores game assets for the game program 109. The data store 428 is assumed to be a relatively large data store that is relatively slow to access. For example, in some embodiments, the data store 428 is one or more non-volatile memory (NVM) devices, such as one or more hard disk drives, one or more flash memory drives, and the like, or any combination thereof. In the depicted embodiment, each of the servers 102 and 103 can access the same data store 428, but in other embodiments each of the servers 102 and 103 includes a separate data store.

Each of the servers 102 and 103 includes a local memory, designated memory 432 and memory 433, respectively. The local memories 432 and 433 each include less overall storage space than the data store 428 but are assumed to be relatively faster to access. Thus, for example, in some embodiments the local memories 432 and 433 are dynamic random-access memory (DRAM) that can be accessed more quickly than the NVM devices of the data store 428.

In response to the user of the client device 104 initiating a game session of the game program 109, each of the servers 102 and 103 initiates execution of the corresponding game instance (instance 111 and 112 respectively). Each instance 111 and 112 retrieves from the data store 428 game assets to implement the game level assigned to the server. Thus, the instance 111 loads game assets 430 from the data store 428 to the memory 432. During implementation of the game level 220, the instance 111 accesses the game assets 430 stored at the memory 432 to generate the streaming frames 115. Similarly, the instance 112 loads game assets 431 from the data store 428 to the memory 433. During implementation of the game level 221, the instance 112 accesses the game assets 431 stored at the memory 433 to generate the streaming frames 116.

In some embodiments, each of the instances 111 and 112 pre-loads the game assets 430 and game assets 431 to the memory 432 and the memory 433 respectively, by loading the assets before implementing the corresponding game level (e.g., before the client device 104 is requesting frames from the corresponding server or before generating frames for streaming to the client device 104.). For example, the instance 112 can pre-load the player state 108 to the memory 433 prior to implementing the game level 221, such as by loading the player state 108 concurrent with or prior to the instance 111 implementing the game level 220. By pre-loading the player state 108, the instance 112 can quickly implement the game level 221 in response to receiving the player state 108, thereby reducing interruption in the game flow associated with the level change.

Figure 5:
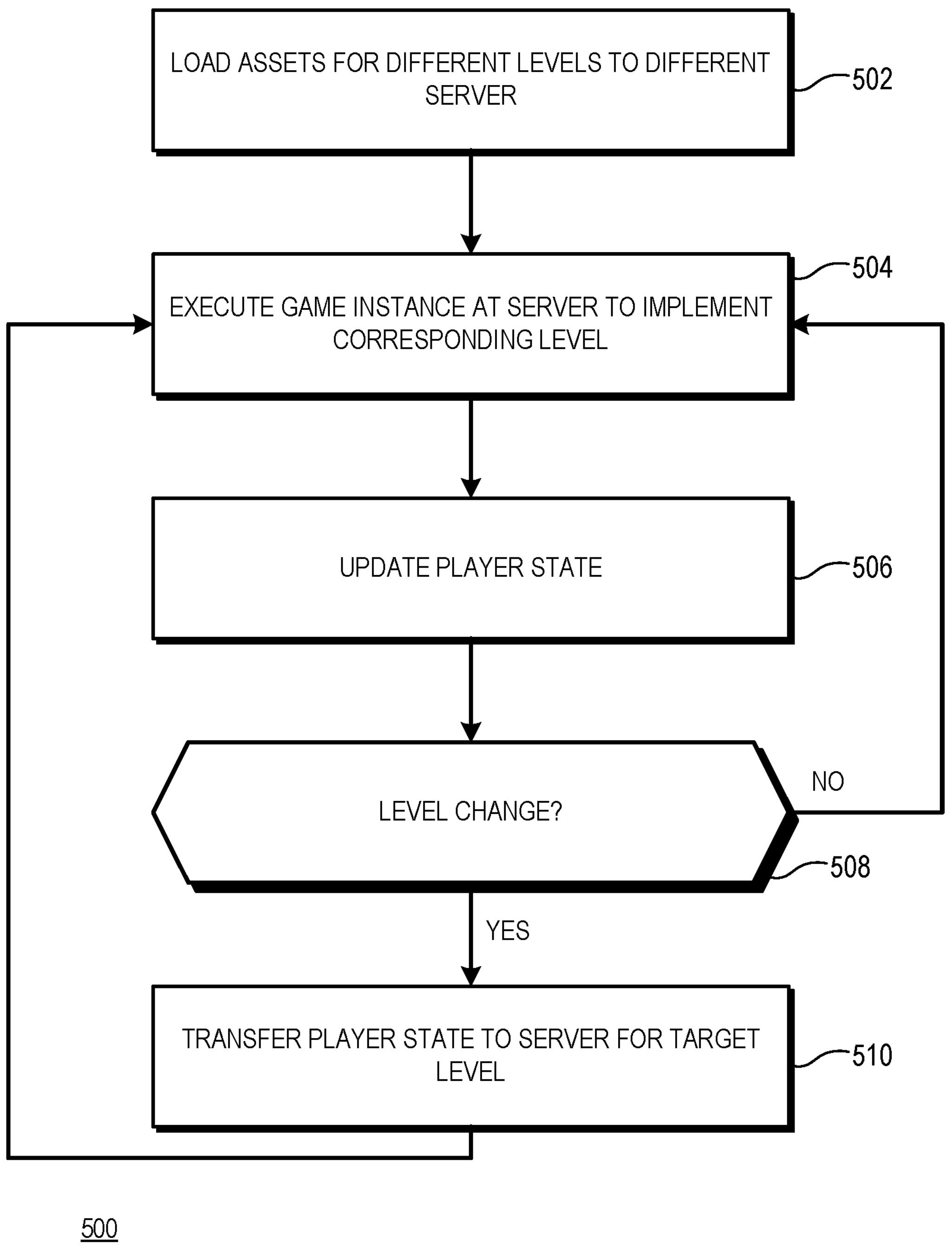
FIG. 5 is a flow diagram of a method of a game streaming system transferring player state information between concurrently executing game instances in response to a game level change in accordance with some embodiments.

FIG. 5 illustrates a flow diagram of a method 500 of transferring a player state from one instance of a game program to another instance of the game program in accordance with some embodiments. For purposes of description, the method 500 is described with respect to an example implementation at the game streaming system 100 of FIG. 1. At block 502, a user of the client device 104 initiates a game session by entering a specified input, or input sequence, at the client device 104. In response, the client device 104 sends a game initiation request, via the network 110, to a specified one of the servers of the set 101. For purposes of this example, it is assumed that the client device 104 sends the game initiation request to the server 102.

In response to the game initiation request, an operating system of the server 102 initiates execution of the instance 111 of the game program 109. Responsive to this initiation, the instance 111 sends requests to the other servers of the set 101 to initiate execution of their own instances of the game program 109. For example, the instance 111 sends a request to the server 103, which in response initiates execution of the instance 112 of the game program 109. Each request sent by the instance 111 indicates a game level to be implemented by the corresponding instance. At block 502, each executing instance loads the assets for the instance's assigned level from the data store 428 to the local memory of the corresponding server.

At block 504, the game instance for the initial level of the current game session implements the initial level by generating rendered frames for streaming responsive to user inputs and to the game state as described above. The game instance implements the level using the assets stored at the local memory of the server. At block 506, in the course of implementing the current level, the server maintains the player state 108, including making any modifications to the player state mandated by the rules of the game implemented by the game program 109.

At block 508, the server implementing the current level determines if it has received an indication of a level change, such as by the user entering inputs at the client device 104 that result the game state indicating a level change. If no level change is indicated, the method flow returns to block 504 and the server continues to implement the current level of the game program 109.

In response to an indication of a level change at block 508, the method flow moves to block 510 and the current server determines the target level indicated by the level change (that is, the level that is to be implemented as a result of the level change. The current server identifies the server assigned to implement the target level (referred to for purposes of description as the target server) and sends the player state 108 to the target server. The target server prepares the received player state for use in implementing the target level, such as by patching the received player state to the game instance, by storing the player state at a specified memory address, and the like. The method returns to block 510 and the instance of the target server implements the target level using the received player state and the game assets stored at the local memory of the target server.

In a first aspect, a method can include executing a first instance of a game program based on a player state to generate a first set of rendered frames for streaming to a client device, pre-loading a first set of game assets associated with the game program for use by a second instance of the game program, in response to an indication of a game level change for the game program, transferring at least a portion of the player state to the second instance of the game program, and executing the second instance of the game program based on the pre-loaded first assets and based on the transferred portion of the player state to generate a second set of rendered frames for streaming to the client device.

In one embodiment of the first aspect, the player state includes a base state and changes to the base state, the changes to the base state based upon executing the first instance of the game program. In a particular embodiment, the method includes transferring at least the portion of the player state comprises transferring the changes to the base state and omitting the base state from the transfer. In a more particular embodiment, the method includes loading the base state at the second instance of the game program in response to the indication of the game level change. In another particular embodiment, the method includes loading the base state at the second instance of the game program prior to the indication of the game level change.

In a further embodiment of the first aspect, the method includes executing the second game instance comprises pre-loading the first set of game assets from a data store to a first memory, and executing the first game instance comprises loading a second set of game assets from the data store to a second memory, the second set of game assets different from the first set of game assets. In a particular embodiment, the method includes loading the second set of game assets comprises pre-loading the second set of game assets. In another embodiment, the method includes executing the first instance of the game program comprises generating the first set of rendered frames at a first graphics processing unit (GPU), and executing the second instance of the game program comprises generating the second set of rendered frames at a second GPU different from the first GPU. In still another embodiment, the method includes executing the first instance of the game program comprises generating the first set of rendered frames at a first server, and executing the second instance of the game program comprises generating the second set of rendered frames at a second server different from the first server.

In a second aspect, a method can include while executing a first instance of a game program to generate a first set of rendered frames for streaming to a client device, identifying first changes in a player state associated with the game program, in response to an indication of a first game level change for the game program, transferring a first change file indicating the identified first changes in the player state to a second instance of the game program, and executing the second instance of the game program based on the transferred first change file to generate a second set of rendered frames for streaming to the client device.

In one embodiment of the second aspect, the method includes while executing the second instance of the game program, identifying second changes in the player state, in response to an indication of a second game level change for the game program, transferring a second change file indicating the identified second changes in the player state to a third instance of the game program, and executing the third instance of the game program based on the transferred second change file to generate a third set of rendered frames for streaming to the client device.

In a third aspect, a non-transitory computer readable medium can include embodying a set of executable instructions, the set of executable instructions to manipulate at least one processor to execute a first instance of a game program based on a player state to generate a first set of rendered frames for streaming to a client device, pre-load a first set of game assets associated with the game program for use by a second instance of the game program in response to an indication of a game level change for the game program, transfer at least a portion of the player state to a second instance of the game program, and execute the second instance of the game program based on the pre-loaded first assets and based on the transferred portion of the player state to generate a second set of rendered frames for streaming to the client device.

In one embodiment of the third aspect, the computer readable medium includes the player state includes a base state and changes to the base state, the changes to the base state based upon executing the first instance of the game program. In a particular embodiment, the computer readable medium includes transferring at least the portion of the player state comprises transferring the changes to the base state and omitting the base state from the transfer. In a more particular embodiment, the computer readable medium includes the set of executable instructions further comprise instructions to load the base state at the second instance of the game program in response to the indication of the game level change. In a further embodiment, the computer readable medium includes the set of executable instructions further comprise instructions to load the base state at the second instance of the game program prior to the indication of the game level change.

In another embodiment of the third aspect, the computer readable medium includes executing the second game instance comprises pre-loading the first set of game assets from a data store to a first memory, and executing the first game instance comprises loading a second set of game assets from the data store to a second memory, the second set of game assets different from the first set of game assets. In a particular embodiment, the computer readable medium includes loading the second set of game assets comprises pre-loading the second set of game assets. In another embodiment, the computer readable medium of includes executing the first instance of the game program comprises generating the first set of rendered frames at a first graphics processing unit (GPU), and executing the second instance of the game program comprises generating the second set of rendered frames at a second GPU different from the first GPU. In still another embodiment, the computer readable medium includes executing the first instance of the game program comprises generating the first set of rendered frames at a first server, and executing the second instance of the game program comprises generating the second set of rendered frames at a second server different from the first server.

In a first aspect, a method can include executing a first instance of a game program based on a player state to generate a first set of rendered frames for streaming to a client device, pre-loading a first set of game assets associated with the game program for use by a second instance of the game program, in response to an indication of a game level change for the game program, transferring at least a portion of the player state to the second instance of the game program, and executing the second instance of the game program based on the pre-loaded first assets and based on the transferred portion of the player state to generate a second set of rendered frames for streaming to the client device.

In one embodiment of the first aspect, the player state includes a base state and changes to the base state, the changes to the base state based upon executing the first instance of the game program. In a particular embodiment, the method includes transferring at least the portion of the player state comprises transferring the changes to the base state and omitting the base state from the transfer. In a more particular embodiment, the method includes loading the base state at the second instance of the game program in response to the indication of the game level change. In another particular embodiment, the method includes loading the base state at the second instance of the game program prior to the indication of the game level change.

In a further embodiment of the first aspect, the method includes executing the second game instance comprises pre-loading the first set of game assets from a data store to a first memory, and executing the first game instance comprises loading a second set of game assets from the data store to a second memory, the second set of game assets different from the first set of game assets. In a particular embodiment, the method includes loading the second set of game assets comprises pre-loading the second set of game assets. In another embodiment, the method includes executing the first instance of the game program comprises generating the first set of rendered frames at a first graphics processing unit (GPU), and executing the second instance of the game program comprises generating the second set of rendered frames at a second GPU different from the first GPU. In still another embodiment, the method includes executing the first instance of the game program comprises generating the first set of rendered frames at a first server, and executing the second instance of the game program comprises generating the second set of rendered frames at a second server different from the first server.

In a second aspect, a method can include while executing a first instance of a game program to generate a first set of rendered frames for streaming to a client device, identifying first changes in a player state associated with the game program, in response to an indication of a first game level change for the game program, transferring a first change file indicating the identified first changes in the player state to a second instance of the game program, and executing the second instance of the game program based on the transferred first change file to generate a second set of rendered frames for streaming to the client device.

In one embodiment of the second aspect, the method includes while executing the second instance of the game program, identifying second changes in the player state, in response to an indication of a second game level change for the game program, transferring a second change file indicating the identified second changes in the player state to a third instance of the game program, and executing the third instance of the game program based on the transferred second change file to generate a third set of rendered frames for streaming to the client device.

In a third aspect, a non-transitory computer readable medium can include embodying a set of executable instructions, the set of executable instructions to manipulate at least one processor to execute a first instance of a game program based on a player state to generate a first set of rendered frames for streaming to a client device, pre-load a first set of game assets associated with the game program for use by a second instance of the game program in response to an indication of a game level change for the game program, transfer at least a portion of the player state to a second instance of the game program, and execute the second instance of the game program based on the pre-loaded first assets and based on the transferred portion of the player state to generate a second set of rendered frames for streaming to the client device.

In one embodiment of the third aspect, the computer readable medium includes the player state includes a base state and changes to the base state, the changes to the base state based upon executing the first instance of the game program. In a particular embodiment, the computer readable medium includes transferring at least the portion of the player state comprises transferring the changes to the base state and omitting the base state from the transfer. In a more particular embodiment, the computer readable medium includes the set of executable instructions further comprise instructions to load the base state at the second instance of the game program in response to the indication of the game level change. In a further embodiment, the computer readable medium includes the set of executable instructions further comprise instructions to load the base state at the second instance of the game program prior to the indication of the game level change.

In another embodiment of the third aspect, the computer readable medium includes executing the second game instance comprises pre-loading the first set of game assets from a data store to a first memory, and executing the first game instance comprises loading a second set of game assets from the data store to a second memory, the second set of game assets different from the first set of game assets. In a particular embodiment, the computer readable medium includes loading the second set of game assets comprises pre-loading the second set of game assets. In another embodiment, the computer readable medium of includes executing the first instance of the game program comprises generating the first set of rendered frames at a first graphics processing unit (GPU), and executing the second instance of the game program comprises generating the second set of rendered frames at a second GPU different from the first GPU. In still another embodiment, the computer readable medium includes executing the first instance of the game program comprises generating the first set of rendered frames at a first server, and executing the second instance of the game program comprises generating the second set of rendered frames at a second server different from the first server.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

executing a first instance of a game program based on a player state to generate a first set of rendered frames to be streamed, the player state indicating a base state of a player prior to modification from executing the first instance and indicating changes to the base state of the player from executing the first instance;

pre-loading a first set of game assets associated with the game program and the base state of the player for use by a second instance of the game program;

in response to an indication of a game level change for the game program, transferring at least a portion of the player state indicating the changes to the base state from executing the first instance to the second instance of the game program; and executing the second instance of the game program based on the pre-loaded first set of game assets and based on the transferred portion of the player state to generate a second set of rendered frames to be streamed.

2. The method of claim 1, wherein transferring at least the portion of the player state comprises transferring the changes to the base state of the player from executing the first instance and omitting the base state of the player from the transfer.

3. The method of claim 2, wherein pre-loading the base state of the player for use by the second instance of the game program is in response to the indication of the game level change.

4. The method of claim 2, wherein pre-loading the base state of the player for use by the second instance of the game program is prior to the indication of the game level change.

5. The method of claim 1, wherein:

executing the second instance comprises pre-loading the first set of game assets from a data store to a first memory; and executing the first instance comprises loading a second set of game assets from the data store to a second memory, the second set of game assets different from the first set of game assets.

6. The method of claim 5, wherein loading the second set of game assets comprises pre-loading the second set of game assets.

7. The method of claim 1, wherein:

executing the first instance of the game program comprises generating the first set of rendered frames at a first graphics processing unit (GPU); and executing the second instance of the game program comprises generating the second set of rendered frames at a second GPU different from the first GPU.

8. The method of claim 1, wherein:

executing the first instance of the game program comprises generating the first set of rendered frames at a first server; and executing the second instance of the game program comprises generating the second set of rendered frames at a second server different from the first server.

9. A method, comprising:

while executing a first instance of a game program to generate a first set of rendered frames to be streamed, identifying changes to a base state of a player based on executing the first instance of the game program, wherein the base state of the player represents a state unmodified by executing the first instance;

pre-loading the base state of the player for use by a second instance of the program;

in response to an indication of a first game level change for the game program, transferring a first change file indicating the identified first changes to the base state of the player to a second instance of the game program; and executing the second instance of the game program based on the transferred first change file to generate a second set of rendered frames to be streamed.

10. The method of claim 9, further comprising:

while executing the second instance of the game program, identifying second changes in the base state of the player;

in response to an indication of a second game level change for the game program, transferring a second change file indicating the identified second changes in the base state of the player to a third instance of the game program; and executing the third instance of the game program based on the transferred second change file to generate a third set of rendered frames to be rendered.

11. A non-transitory computer readable medium embodying a set of executable instructions, the set of executable instructions to manipulate at least one processor to:

execute a first instance of a game program based on a player state to generate a first set of rendered frames to be streamed, the player state indicating a base state of a player prior to modification by the first instance of the game program and indicating changes to the base state of the player from executing the first instance;

pre-load a first set of game assets associated with the game program and the base state of the player for use by a second instance of the game program in response to an indication of a game level change for the game program, transfer at least a portion of the player state to a second instance of the game program; and execute the second instance of the game program based on the pre-loaded first set of game assets and based on the transferred portion of the player state to generate a second set of rendered frames to be streamed.

12. The computer readable medium of claim 11, wherein transferring at least the portion of the player state comprises transferring the changes to the base state of the player from executing the first instance and omitting the base state of the player from the transfer.

13. The computer readable medium of claim 12, wherein the set of executable instructions further comprise instructions to:

pre-load the base state at the second instance of the game program in response to the indication of the game level change.

14. The computer readable medium of claim 12, wherein the set of executable instructions further comprise instructions to:

pre-load the base state at the second instance of the game program prior to the indication of the game level change.

15. The computer readable medium of claim 11, wherein:

executing the second instance comprises pre-loading the first set of game assets from a data store to a first memory; and executing the first instance comprises loading a second set of game assets from the data store to a second memory, the second set of game assets different from the first set of game assets.

16. The computer readable medium of claim 15, wherein loading the second set of game assets comprises pre-loading the second set of game assets.

17. The computer readable medium of claim 11, wherein:

executing the first instance of the game program comprises generating the first set of rendered frames at a first graphics processing unit (GPU); and executing the second instance of the game program comprises generating the second set of rendered frames at a second GPU different from the first GPU.

18. The computer readable medium of claim 11, wherein:

executing the first instance of the game program comprises generating the first set of rendered frames at a first server; and executing the second instance of the game program comprises generating the second set of rendered frames at a second server different from the first server.

* * * * *